(12) United States Patent
Roquemore, III

(10) Patent No.: US 7,436,285 B1
(45) Date of Patent: Oct. 14, 2008

(54) DUAL-COMMUNICATION ELECTRONIC SHELF LABEL SYSTEM AND METHOD

(75) Inventor: John Peter Roquemore, III, Snellville, GA (US)

(73) Assignee: NCR Corporation, Dayton, OH (US)

( * ) Notice: Subject to any disclaimer, the term of this patent is extended or adjusted under 35 U.S.C. 154(b) by 735 days.

(21) Appl. No.: 10/659,661

(22) Filed: Sep. 10, 2003

(51) Int. Cl.
*G05B 19/00* (2006.01)

(52) U.S. Cl. ............... 340/5.91; 340/825.72; 340/10.1

(58) Field of Classification Search ............... 340/10.1, 340/825.49, 825.72, 825.73, 825.35, 5.91, 340/825.69; 705/26; 235/383
See application file for complete search history.

(56) References Cited

U.S. PATENT DOCUMENTS

| | | | | |
|---|---|---|---|---|
| 5,794,215 A | * | 8/1998 | Goodwin, III | 705/26 |
| 6,046,682 A | * | 4/2000 | Zimmerman et al. | 340/825.49 |
| 6,318,631 B1 | * | 11/2001 | Halperin | 235/383 |
| 6,419,154 B1 | * | 7/2002 | Dalton et al. | 235/383 |
| 6,736,316 B2 | * | 5/2004 | Neumark | 235/383 |
| 6,762,674 B2 | * | 7/2004 | Matsushita | 340/5.91 |
| 6,853,294 B1 | * | 2/2005 | Ramamurthy et al. | 340/10.1 |

\* cited by examiner

*Primary Examiner*—Edwin C Holloway, III
(74) *Attorney, Agent, or Firm*—Paul W. Martin; Priest & Goldstein PLLC

(57) ABSTRACT

A dual-communication electronic shelf label system and method which increase communication bandwidth and minimize competition with other RF systems in a store for bandwidth. The system includes a base station including first wireless downlink communication circuitry and first wireless uplink communication circuitry operating in a different mode than the first wireless downlink communication circuitry, and an electronic shelf label including second wireless downlink communication circuitry for receiving messages from first wireless downlink communication of the base station, and second wireless uplink communication circuitry for sending messages to first wireless uplink communication of the base station.

16 Claims, 2 Drawing Sheets

DUAL-COMMUNICATION ELECTRONIC SHELF LABEL SYSTEM AND METHOD

BACKGROUND OF THE INVENTION

The present invention relates to electronic shelf label (ESL) systems, and more specifically to a dual-communication ESL system and method.

ESL systems typically include a plurality of ESLs. ESLs typically display prices of corresponding merchandise items on store shelves and are typically attached to a rail along the leading edge of the shelves. A store may contain thousands of ESLs to display information about the merchandise items. The ESLs are coupled to a central server from where information about the ESLs is typically maintained. Price information displayed by the ESLs is typically obtained from a price look-up (PLU) file.

ESL systems have bandwidth limitations that could be exceeded as retailers discover the benefits of real-time price optimization. ESL systems also compete with other systems for bandwidth. These other systems include radio frequency identification (RFID) systems, radio frequency (RF) planogram systems, and RF communication systems.

Therefore, it would be desirable to provide a dual-communication ESL system and method.

SUMMARY OF THE INVENTION

In accordance with the teachings of the present invention, a dual-communication electronic shelf label (ESL) system and method is provided.

The system includes a base station including first wireless downlink communication circuitry and first wireless uplink communication circuitry operating in a different mode than the first wireless downlink communication circuitry, and an electronic shelf label including second wireless downlink communication circuitry for receiving messages from first wireless downlink communication of the base station, and second wireless uplink communication circuitry for sending messages to first wireless uplink communication of the base station.

It is accordingly an object of the present invention to provide a dual-communication ESL system and method.

It is another object of the present invention to minimize conflicts over communication bandwidth by providing different channels for uplink and downlink communication with an ESL.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
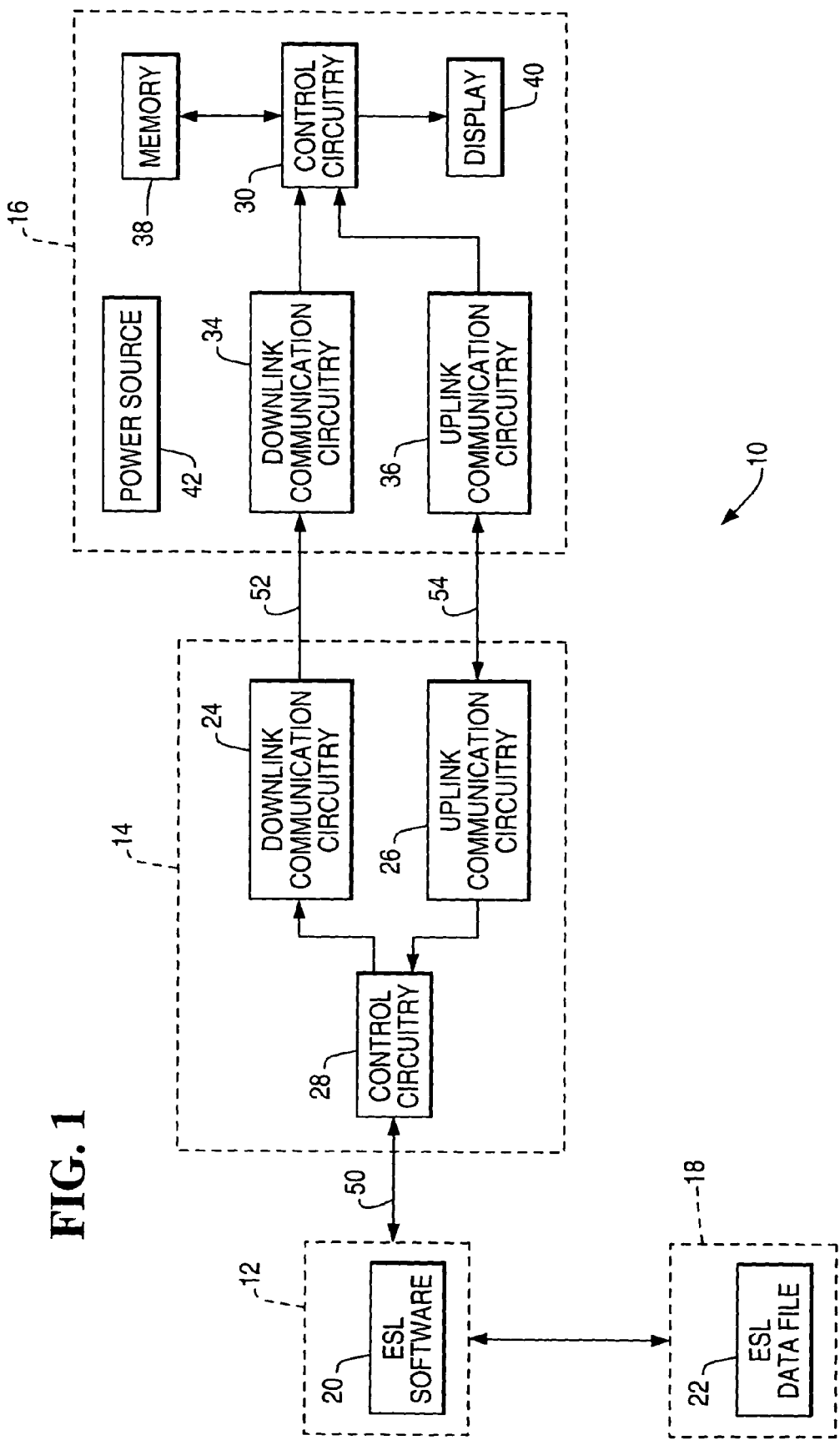
FIG. 1 is a block diagram of an ESL system.

Referring now to FIG. 1, ESL system 10 includes computer 12, base station 14, and ESL 16.

Computer 12 executes ESL software 20. ESL software 20 records, schedules, and transmits all messages to ESLs 16 through intermediate communication stations 14, and receives and analyzes messages from ESLs 16 through intermediate communication stations 14.

ESL software 20 also maintains and uses ESL data file 22, which contains item information and ESL identification information.

Storage medium 18 stores ESL data file 22. Storage medium 18 is preferably a fixed disk drive.

Base station 14 communicates messages from computer 12 to ESLs 16 and responses from ESLs 16 to computer 12. Communication with computer 12 is via cable 50. Communication with ESLs 16 is over two wireless channels, an uplink channel 52 and a downlink channel 54.

Base station 14 includes control circuitry 28, downlink communication circuitry 24, and uplink communication circuitry 26.

Control circuitry 28 controls operation of base station 14. Control circuitry 28 is also providing downlink data to downlink communication circuitry 24 and obtaining uplink data from uplink communication circuitry 26.

Downlink communication circuitry 24 sends downlink data to ESL 16 over a first communication channel 52.

Uplink communication circuitry 24 receives uplink data from ESL 16 over a second communication channel 54.

Downlink and uplink channels 52 and 54 employ different communication methods. Channels 52 and 54 may occupy different parts of a band, or may occupy different bands, or may use different communication types.

For example, downlink channel 52 may include wireless RF communication at a frequency of 2.4 GHz and uplink channel 54 may include wireless RF communication at 400 MHz.

As another example, downlink channel 52 may include wireless RF communication and uplink channel 54 may include wireless infrared communication.

As yet another example, downlink channel 52 may include wireless RF communication and uplink channel 54 may include inductive coupling.

Base station 14 and ESL 16 maximize air time by facilitating communication over both of channels 52 and 54 simultaneously. Base station 14 could communicate to one ESL 16 during one time period, start receiving uplink data from ESL 16 in the next time period while beginning communications to another ESL 16 at the same time. Communication is full-duplex, which effectively doubles the communication bandwidth of ESL system 10.

ESLs 16 each include control circuitry 30, downlink communication circuitry 34, uplink communication circuitry 36, memory 38, display 40, and power source 42.

Control circuitry 30 controls operation of ESL 16. Control circuitry 30 receives messages from computer 12 and executes commands in the messages. Control circuitry 30 sends responses to computer 12. Control circuitry 30 controls display of information by display 40. Control circuitry 30 controls storage of display data in memory 38.

Downlink communication circuitry 34 receives messages from downlink communication circuitry 24 in base station 14.

Uplink communication circuitry 36 sends messages to uplink communication circuitry 26 in base station 14.

Memory 38 stores display and other information.

Display 40 displays price and other information. Display 40 is preferably a liquid crystal display (LCD).

Power source 42 provides power to ESL 16. Power source 42 may include a battery, solar cell, or other power source.

Figure 2:
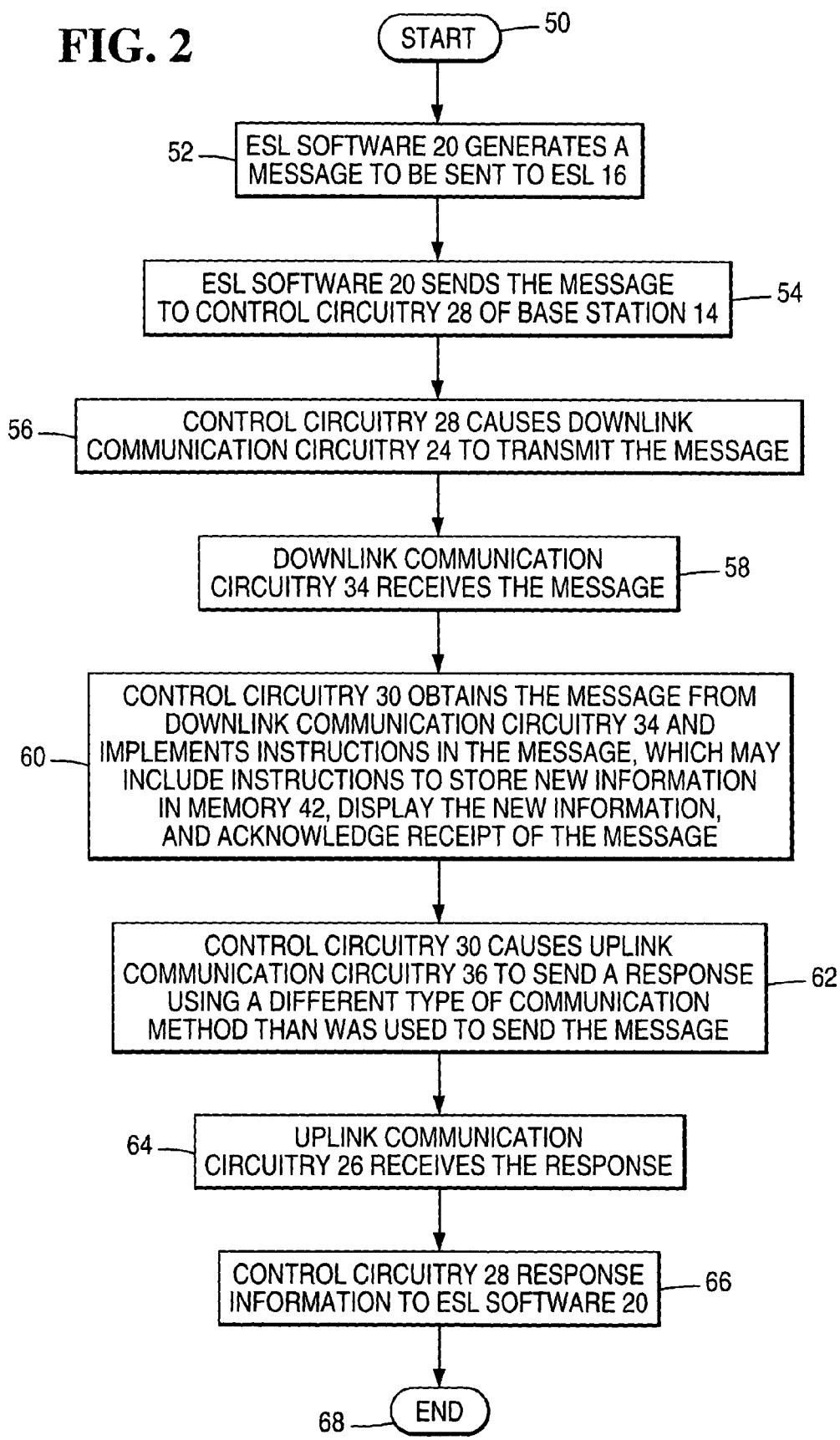
FIG. 2 is a flow diagram illustrating operation of the ESL system.

Turning now to FIG. 2, the operation of ESL system 10 is explained in more detail, beginning with START 50.

In step 52, ESL software 20 generates a message to be sent to ESL 16. ESL software 20 formats and schedules the message for transmission.

In step 54, ESL software 20 sends the message to control circuitry 28 of base station 14.

In step 56, control circuitry 28 causes downlink communication circuitry 24 to transmit the message.

In step 58, downlink communication circuitry 34 receives the message.

In step 60, control circuitry 30 obtains the message from downlink communication circuitry 34 and implements instructions in the message, which may include instructions to store new information in memory 42, display the new information, and acknowledge receipt of the message.

In step 62, control circuitry 30 causes uplink communication circuitry 36 to send a response using a different type of communication method than was used to send the message by downlink communication circuitry 24. For example, downlink communication circuitry 24 may send the message using wireless RF communication at a frequency of 2.4 GHz and uplink communication circuitry 36 may send the response using wireless RF communication at 400 MHz.

Advantageously, this form of full-duplex communication increases communication bandwidth and minimizes competition with other RF systems in a store for bandwidth.

In step 64, uplink communication circuitry 26 receives the response.

In step 66, control circuitry 28 forwards response information to ESL software 20.

In step 68, operation ends.

Although the present invention has been described with particular reference to certain preferred embodiments thereof, variations and modifications of the present invention can be effected within the spirit and scope of the following claims.

What is claimed is:

1. An electronic shelf label system employing duplex data communication comprising:
    a base station including first wireless downlink communication circuitry and first wireless uplink communication circuitry operating in a different mode than the first wireless downlink communication circuitry; and
    a plurality of electronic shelf labels, each electronic shelf label including second wireless downlink communication circuitry for receiving messages from the first wireless downlink communication circuitry of the base station, and second wireless uplink communication circuitry for sending messages directly to the first wireless uplink communication circuitry of the base station,
    wherein the base station operates to concurrently transmit a first message to a first electronic shelf label and receive an overlapping second message from a second electronic shelf label over separate communication channels.

2. The system of claim 1, further comprising a computer coupled to the base station via a cable for sending messages to the electronic shelf labels via the first and second wireless downlink communication circuitries, and for receiving messages from the electronic shelf labels via the first and second wireless uplink communication circuitries.

3. The system of claim 1, wherein the first and second wireless downlink communication circuitries communicate at a first frequency and the first and second wireless uplink communication circuitries communicate at a second frequency different than the first frequency.

4. The system of claim 1, wherein the first and second wireless downlink communication circuitries communicate in a first communication band and the first and second wireless uplink communication circuitries communicate in a second communication band different than the first communication band.

5. The system of claim 1, wherein the first and second wireless downlink communication circuitries communicate at a frequency of about 2.4 GHz and the first and second wireless uplink communication circuitries communicate at an infrared frequency.

6. The system of claim 1, wherein the first and second wireless downlink communication circuitries communicate at a frequency of about 2.4 GHz and the first and second wireless uplink communication circuitries communicate through inductive coupling.

7. The system of claim 1, wherein the first and second wireless downlink communication circuitries communicate at a first frequency of about 2.4 GHz and the first and second wireless uplink communication circuitries communicate at a second frequency substantially lower than the first frequency.

8. The system of claim 7, wherein the second frequency is about 400 MHz.

9. An electronic shelf label system employing duplex data communication between a base station and a plurality of electronic shelf labels, the system comprising:
    a base station including first wireless downlink communication circuitry and first wireless uplink communication circuitry operating at a substantially lower frequency than the first wireless downlink communication circuitry;
    a plurality of electronic shelf labels, each electronic shelf label including second wireless downlink communication circuitry for receiving messages from the first wireless downlink communication circuitry of the base station, and second wireless uplink communication circuitry for directly sending messages to the first wireless uplink communication circuitry of the base station; and
    a computer coupled to the base station via a cable for sending messages to the electronic shelf label via the first and second wireless downlink communication circuitries, and for receiving messages from the electronic shelf label via the first and second wireless uplink communication circuitries,
    wherein the base station operates to concurrently transmit a first message to a first electronic shelf label and receive an overlapping second message from a second electronic shelf label over separate communication channels.

10. A method of duplex data communication between a base station and a plurality of electronic shelf labels comprising the steps of:
    a) wirelessly sending a first message in a first time period to a first electronic shelf label by utilizing first downlink communication circuitry in the base station;
    b) receiving the message utilizing second downlink communication circuitry in the first electronic shelf label;
    c) wirelessly sending a response to the base station in a second time period using a different mode of communication utilizing first uplink communication circuitry in the electronic shelf label;
    d) receiving the response in a second time period from the first electronic shelf label by utilizing second uplink communication circuitry in the base station; and
    e) wirelessly sending a second message during the second time period to a second electronic shelf label utilizing the first downlink communication circuitry in the base station, sending of the second message to the second electronic shelf label being performed over a different communication channel than receiving of the response from the first electronic shelf label.

11. The method of claim 10, further comprising the steps of:
   f) sending the message to the base station through a cable by a computer; and
   g) receiving the response through the cable by the computer.

12. A method of concurrently communicating with a plurality of electronic shelf labels comprising the steps of:
   a) sending first and second messages to a base station through a cable by a computer;
   b) wirelessly sending the first message to a first electronic shelf label using a first frequency and first downlink communication circuitry in the base station;
   c) receiving the first message by second downlink communication circuitry in the first electronic shelf label;
   d) wirelessly sending a response to the base station at a second frequency different than the first frequency by utilizing first uplink communication circuitry in the first electronic shelf label;
   e) receiving the response by second uplink communication circuitry in the base station;
   f) transmitting the second message to a second electronic shelf label using the first frequency and first down link communication circuitry in the base station concurrently with said step of receiving the response, receiving of the first message from the first electronic shelf label and transmitting of the second message to the second electronic shelf label occurring simultaneously over separate communication channels; and
   g) receiving the response through the cable by the computer.

13. The method of claim 10 wherein the first and second wireless downlink communication circuitries communicate at a first frequency and the first and second wireless uplink circuitries communicate at a second frequency different than the first frequency.

14. The method of claim 13 wherein the first frequency is approximately 2.4 GHz.

15. The method of claim 13 wherein the second frequency is approximately 400 MHz.

16. The method of claim 13 wherein the second frequency is an infrared frequency.

* * * * *